UNITED STATES PATENT OFFICE.

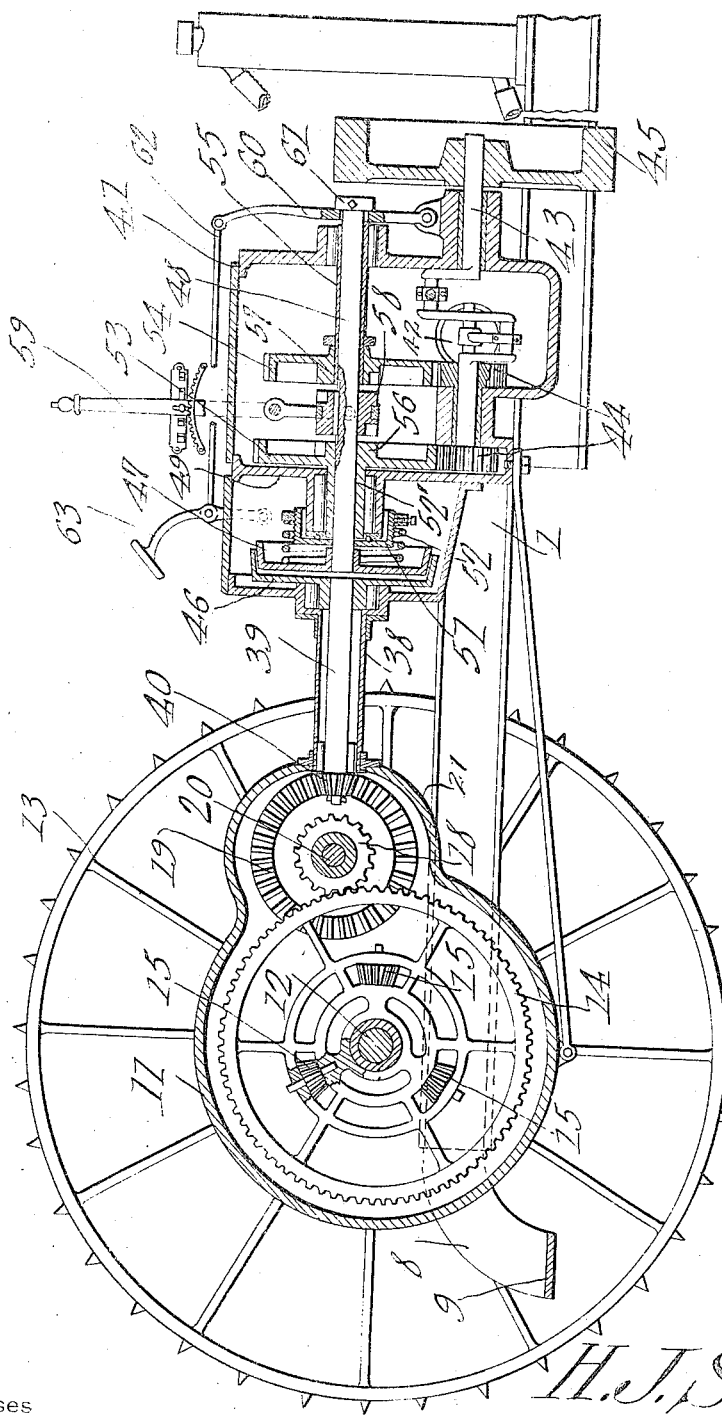

HENRY J. SMITH, OF MINNEAPOLIS, MINNESOTA, ASSIGNOR TO H. J. SMITH TRACTOR COMPANY, OF THE COUNTY OF HENNEPIN, MINNESOTA, A CORPORATION OF MINNESOTA.

GEARING.

1,222,153.  Specification of Letters Patent.  Patented Apr. 10, 1917.

Application filed May 3, 1915.  Serial No. 25,574.

*To all whom it may concern:*

Be it known that I, HENRY J. SMITH, a citizen of the United States, residing at Minneapolis, in the county of Hennepin and State of Minnesota, have invented a new and useful Gearing, of which the following is a specification.

This invention relates to tractors especially designed for all practical agricultural purposes, such, for example, as in drawing agricultural implements over fields, in transporting produce, etc.

One object is to provide a tractor the transmission mechanism of which is compactly arranged, is fully housed and protected, and, by working in oil, requires less power than would otherwise be necessary.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing, which is a vertical longitudinal section through a tractor embodying the present improvements, the preferred form of the invention has been shown.

Referring to the drawing by characters of reference 1 designates a frame which can be of any suitable size and construction and preferably made of channel metal.

The rear end of the frame 1 is formed with a depending portion 8 having a cross strip 9 to which plows or other implements to be drawn may be secured. This frame is preferably extended under an axle 12 which extends through a casing 11, said casing being provided with an extension 21 in which is arranged a transverse shaft 20 provided with a gear 19 designed to receive motion, through a gear 40, from a longitudinal shaft 39 arranged within a tubular member 38 projecting from the extension 21. Any suitable arrangement of gearing, indicated at 18, 14 and 15, can be utilized for transmitting motion from the shaft 20 to the axle 12 and thus to the rear supporting wheels, one of which has been indicated at 13. Inasmuch as the means employed for transmitting motion from shaft 29 to the wheels constitutes no part of the present invention it is not deemed necessary to enter into a detailed description thereof or to illustrate the same in detail.

The front end of the tubular member 38 is connected to a housing 41 to which are connected oppositely extending cylinders of a motor of the hydro-carbon type and one of which cylinders has been shown at 42, the shaft 43 of the motor being journaled in the lower portion of the housing as shown and having the usual gears 44 for controlling the operation of the engine valves. This shaft is also provided with a fly wheel 45.

Secured to that end of shaft 39 within the housing 41 is one member 46 of a friction clutch, the other member 47 of said clutch being keyed or otherwise secured to one end of a shaft 48 which is separate from but alines with shaft 39 and is mounted to slide and rotate within one end wall of said housing and within a partition 49 provided within the housing. Loosely mounted on the shaft 48 and bearing against housing 41 is a collar 51 constituting an abutment for a spring 52 which bears against the clutch member 47. This spring 52 tends to hold the clutch member 47 pressed into engagement with clutch member 46.

A sleeve 52' is mounted for rotation on shaft 48 and carries a gear 53 which constantly meshes with one of the gears 44. Another gear 54 is mounted for rotation on a sleeve 55 through which shaft 48 extends. The two gears 53 and 54 are provided on their inner faces with clutch members 56 and 57 respectively and feathered on shaft 48 between these clutch members is a clutch member 58 adapted to be shifted by a lever 59 into engagement with either of the clutch members 56 and 57, thus to couple said gears 53 and 54 to the shaft 48. When the clutch member 58 is in its normal position, it is out of engagement with both of the clutch members 56 and 57 so that the rotation of gears 44 will not result in the actuation of shaft 48.

The two gears 53 and 54 are of different diameters so that when motion is transmitted to shaft 48 from one gear 44 through gear 54, said shaft will be driven at a greater speed than when motion is transmitted through the other gear 44 and gear 53 to shaft 48.

In order that the clutch 47 may be shifted and held out of engagement with clutch member 46, a lever 60 is mounted adjacent the outer end of shaft 48, said shaft being loosely journaled within the lever and having a head 61 engaging the lever. A link 62 connects this lever 60 to a foot lever 63 or the like and it will be obvious that by actuating the foot lever, the shaft 48 can be shifted longitudinally against the action of spring 51, thus to disengage clutch member 47 from clutch member 46 without, however, moving the gears 53 and 54 out of mesh with the respective gears 44.

As the shafts 39 and 48 are normally coupled together the shifting of clutch 58 into engagement with either of the clutch members 56 and 57 will result in the actuation of shaft 39 and the entire tractor at either of two speeds. The motor can be promptly uncoupled from the drive wheels by shifting shaft 48 longitudinally so as to disengage clutch member 47 from clutch member 46 as hereinbefore pointed out.

As shown in the drawing, ball and roller bearings are provided wherever desired, thus to reduce friction to the minimum.

The housing 41 constitutes a container for a lubricant so that all of the parts within said housing will be kept thoroughly lubricated and will be protected from dust, etc.

What is claimed is:—

1. Transmission gearing including alining shafts, means for transmitting motion from one of said shafts, gears mounted to rotate on the other one of said shafts, drive gears meshing with the respective gears on the second mentioned shaft, means for coupling said second shaft to either of the gears thereon, said gears being designed to rotate the second shaft at different speeds, coöperating clutch members upon the respective shafts, and means for shifting said second shaft longitudinally to uncouple it from the first named shaft.

2. Transmission gearing including a shaft mounted to slide and rotate, gears revoluble with respect to the shaft, separate drive gears meshing with the respective gears on said shaft, means for coupling the shaft to either of the gears thereon to drive the shaft at either of two speeds, a clutch member at one end of the shaft, and means for shifting the shaft longitudinally to move the clutch member out of its normal position.

3. Transmission gearing including a shaft mounted to slide and rotate, gears revoluble about the shaft, separate drive gears meshing with the respective gears on said shaft, means for coupling the shaft to either of the gears thereon to drive the shaft at either of two speeds, a clutch member at one end of the shaft, means for shifting the shaft longitudinally to move the clutch member out of its normal position, a driven shaft alining with the first mentioned shaft, and a clutch member normally engaged by the clutch member on the end of the first named shaft.

4. Transmission gearing including a shaft mounted to slide and rotate, gears revoluble about the shaft, separate drive gears meshing with the respective gears on said shaft, means for coupling the shaft to either of the gears thereon to drive the shaft at either of two speeds, a clutch member at one end of the shaft, means for shifting the shaft longitudinally to move the clutch member out of its normal position, a driven shaft alining with the first named shaft, a clutch member normally engaged by the clutch member on the end of the first named shaft, and an oil containing housing inclosing the first named shaft, the gears and the clutch members.

In testimony that I claim the foregoing as my own, I have hereto affixed my signature in the presence of two witnesses.

HENRY J. SMITH.

Witnesses:
PAUL J. THOMPSON,
KATHERINE MAHON.